(12) United States Patent
Nodzak et al.

(10) Patent No.: US 11,606,271 B2
(45) Date of Patent: *Mar. 14, 2023

(54) NETWORK DIRECTIONALITY MAPPING SYSTEM

(71) Applicant: Bank of America Corporation, Charlotte, NC (US)

(72) Inventors: Conor Mitchell Liam Nodzak, Charlotte, NC (US); Kyle Scott Sorensen, Charlotte, NC (US); Wyatt Edward Maxey, Charlotte, NC (US); Sandip Kumar, Matthews, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/681,992

(22) Filed: Feb. 28, 2022

(65) Prior Publication Data

US 2022/0182299 A1 Jun. 9, 2022

Related U.S. Application Data

(63) Continuation of application No. 16/945,000, filed on Jul. 31, 2020, now Pat. No. 11,303,548.

(51) Int. Cl.
*H04L 43/045* (2022.01)
*H04L 43/062* (2022.01)

(52) U.S. Cl.
CPC .......... *H04L 43/045* (2013.01); *H04L 43/062* (2013.01)

(58) Field of Classification Search
CPC .......................... H04L 43/045; H04L 43/062
See application file for complete search history.

(56) References Cited

U.S. PATENT DOCUMENTS

| 8,331,234 | B1 | 12/2012 | Newton et al. |
| 8,588,111 | B1 | 11/2013 | Kridlo |
| 9,787,546 | B2 | 10/2017 | Bardgett et al. |
| 9,979,605 | B2 | 5/2018 | Sinn |
| 10,868,707 | B1 | 12/2020 | Friedman et al. |

(Continued)

OTHER PUBLICATIONS

RFC 793: "Transmission Control Protocol"; Darpa Internet Program, 1981 (Year: 1981).

*Primary Examiner* — Jerry B Dennison
(74) *Attorney, Agent, or Firm* — Banner & Witcoff, Ltd.

(57) ABSTRACT

A computing system for monitoring, validating, and illustrating data transfer between computing devices in an enterprise computing system receives packet header information from network sensing modules. The computing system validates the records of the collected packet header information and discards erroneous records. The computing system corrects invalidly recorded information in the records. The computing system identifies records corresponding to unidirectional and bidirectional data transfer, generating a single data transfer record for a unidirectional data transfer and a pair of data transfer records for a bidirectional data transfer. The computing system stores the data transfer records in a standard data structure accessible at a user interface. The computing system generates a graphical directionality map for display at the user interface based on the input data transfer records to depict the data transfer relationships between computing devices.

20 Claims, 7 Drawing Sheets

(56) References Cited

U.S. PATENT DOCUMENTS

| | | |
|---|---|---|
| 10,970,942 B2 | 4/2021 | Zhang |
| 2007/0171966 A1 | 7/2007 | Light et al. |
| 2009/0198707 A1* | 8/2009 | Rohner ............... H04L 63/1408 |
| 2009/0240790 A1 | 9/2009 | Utsunomiya et al. |
| 2010/0115121 A1 | 5/2010 | Roos et al. |
| 2013/0254891 A1 | 9/2013 | Onoda |
| 2014/0286174 A1 | 9/2014 | Iizuka et al. |
| 2015/0261599 A1 | 9/2015 | Hara |
| 2016/0239230 A1 | 8/2016 | Sato et al. |
| 2018/0196694 A1 | 7/2018 | Banerjee et al. |
| 2018/0287876 A1* | 10/2018 | Strobel .................. H04L 41/12 |
| 2019/0215228 A1 | 7/2019 | Ramachandran et al. |
| 2020/0036616 A1 | 1/2020 | Kane et al. |
| 2020/0053173 A1 | 2/2020 | Dasgupta et al. |
| 2020/0167784 A1 | 5/2020 | Kursun |
| 2020/0167785 A1 | 5/2020 | Kursun |
| 2020/0167786 A1 | 5/2020 | Kursun |
| 2020/0167787 A1 | 5/2020 | Kursun |
| 2020/0169483 A1 | 5/2020 | Kursun |
| 2020/0220812 A1 | 7/2020 | Butcher et al. |
| 2021/0203595 A1 | 7/2021 | Rao et al. |
| 2021/0216908 A1 | 7/2021 | Lu et al. |
| 2021/0218634 A1 | 7/2021 | Harter |

\* cited by examiner

NETWORK DIRECTIONALITY MAPPING SYSTEM

CROSS REFERENCE TO RELATED APPLICATIONS

This application is a continuation of and claims priority to patent application Ser. No. 16/945,000 entitled "Network Directionality Mapping System" filed on Jul. 31, 2020, which is incorporated by reference in its entirety.

BACKGROUND

Aspects of the disclosure relate to mapping network communications between computing devices. One or more aspects of the disclosure relate to a network directionality mapping system capable of analyzing network traffic data to generate standardized data transfer records and generating directional maps representative of data movement within an enterprise computing system.

Today, enterprise organizations (e.g., business organizations, educational institutions, governmental entities, and the like) utilize a number of computing devices (e.g., servers) within computing systems to manage, host, and/or transfer data across a variety of business units and computing platforms. However, accurately managing and mapping data transfer between computing devices is a complex process, where a large amount of data transferred between computing devices adds to the complexity of the mapping process. Existing network monitoring methods lack standardized reporting techniques for monitored network traffic and may mischaracterize data transfer between servers. Further, existing network monitoring methods lack capabilities to graphically depict data transfer between computing devices of an enterprise computing system. As such, tracking and presenting data transfer operations between computing devices associated with an enterprise computing system may suffer through application of existing techniques and methods.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with accurately tracking and mapping data transfer operations between computing devices.

In some cases, an enterprise computing system associated with an enterprise organization may enable a plurality of data transfer operations between distributed computing devices (e.g., servers) to maintain fundamental enterprise operations. Network sensing devices may collect information related to data transfer between servers and/or clusters of servers, where the information is collected in an unformatted state that requires standardization for further analysis. As such, an enterprise computing system may include one or more modules programmed to analyze and transform the collected information into a standardized format.

In some cases, a network directionality mapping system may include one or more elements to track, analyze, validate, and illustrate information associated with data transfer operations between computing devices of the enterprise computing system. In some cases, the network directionality mapping system may provide a user interface module whose functions are accessible via a user interface of a computing device. The user interface module may provide and/or generate one or more user interface screens to enable one or more individuals (e.g., system administrators) to access, configure, and/or analyze the network traffic data (e.g., data transfer information between servers) aggregated by the network directionality mapping system. The network directionality mapping system may interface and/or integrate with network sensing modules that monitor network traffic data between servers and/or clusters of servers within the enterprise computing system. Additionally or alternatively, the network directionality mapping system may directly monitor network traffic data between servers and/or clusters of servers within the enterprise computing system via one or more network monitoring devices that may monitor network traffic information between servers and/or clusters of servers and may aggregate the information over specified intervals of time.

In some cases, the network directionality mapping system may fetch and/or receive network traffic information) for one or more data transfer operations between servers. For example, the network directionality mapping system may receive packet header information associated with a data transfer between a first server and a second server. The packet header information may include an identifier for each server involved in the data transfer (e.g., an internet protocol (IP) address), the port of each server associated with the data transfer, the number of packets transferred between each server, the timestamp associated with the data transfer, and the like. Based on the received network traffic information, the network directionality mapping system may analyze the identified packet header information to validate the associated data transfer such as to verify the monitored information from the network sensing module and to identify whether a unidirectional data transfer or a bidirectional data transfer is involved. If the packet header information is invalid, the packet header information may be discarded. In some cases, the network directionality mapping system may correct packet header information that was invalidly recorded for a data transfer. If the packet header information is validated and the data transfer is identified as unidirectional, the network directionality mapping system may generate a data transfer record associated with the unidirectional data transfer for storage in one or more data stores associated with data directionality. If the packet header information is validated and the data transfer is identified as bidirectional, the network directionality mapping system may separate the received information for the data transfer to generate a pair of data transfer records associated with the bidirectional data transfer for storage in the one or more data stores associated with data directionality.

In some cases, the network directionality mapping system may include a directionality map generator. In some cases, after the data transfer record(s) for a data transfer (e.g., unidirectional, bidirectional) have been generated and stored by the network directionality mapping system, the directionality map generator may access and analyze the stored data transfer record(s) to generate a mapping illustrative of the data transfers occurring on the enterprise network. The directionality map generator may identify the source server and target server associated with the data transfer in the data transfer records and may generate a directionality map representing the relationship (e.g., the link) between the source server and the target server. The directionality map may graphically depict the directional nature of the relationship (e.g., a source server to a target server). At the user interface, an individual (e.g., a system administrator) may configure the directionality map generator to generate a directionality map that includes one or more data transfer records to further analyze network communications between servers of the enterprise computing system. Data records may be selected based on the server, location of the server, applications and/or systems associated with the server, time of the data transfer, and the like.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
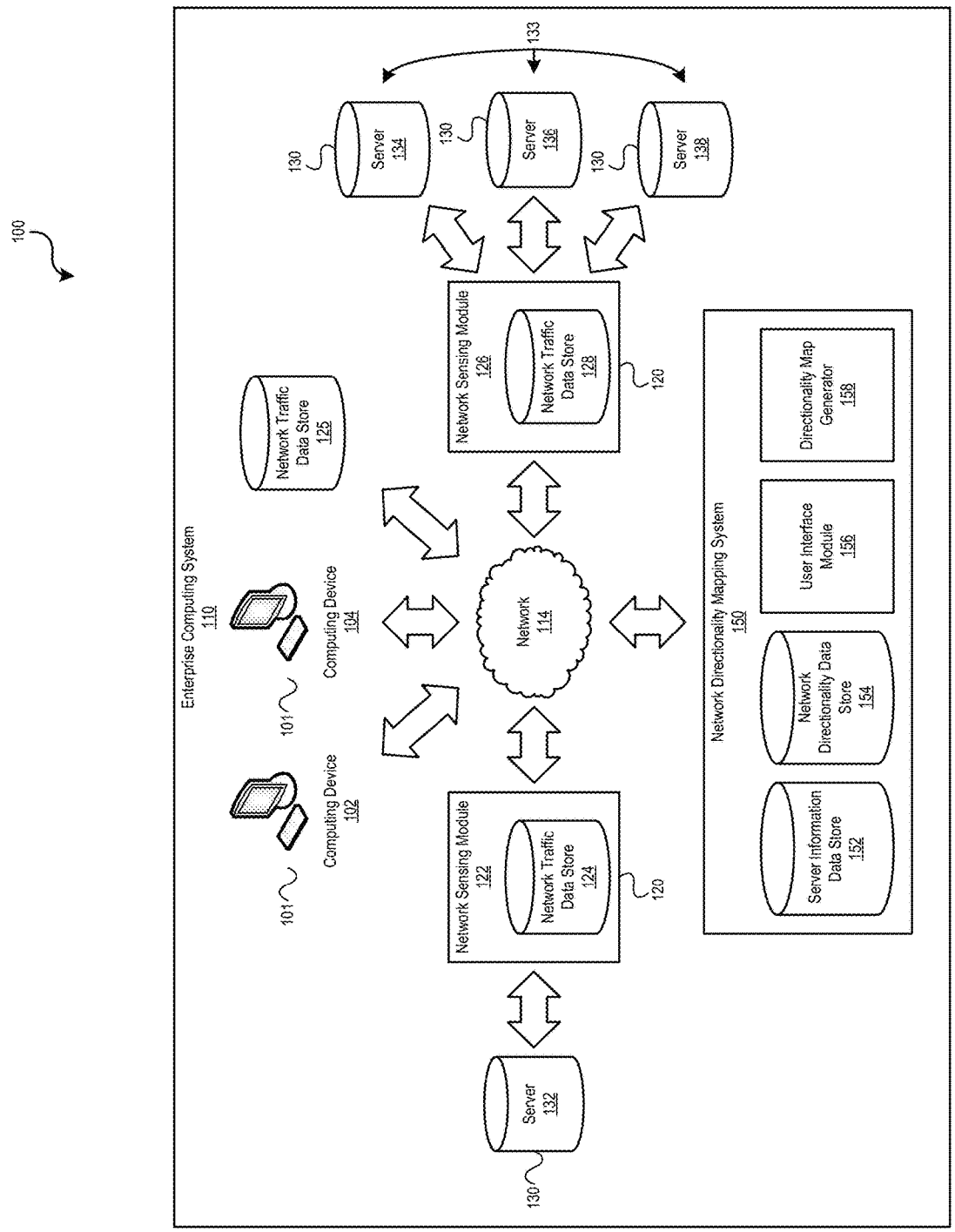
FIG. 1 depicts an illustrative computing environment for analyzing network traffic data to formulate standardized data transfer records and for generating directional maps indicating data transfer between servers of an enterprise computing system in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

The above-described examples and arrangements are merely some example arrangements in which the systems described herein may be used. Various other arrangements employing aspects described herein may be used without departing from the invention.

A need has been identified for an improved and robust system capable of monitoring, standardizing, and illustrating network communication (e.g., data transfer) between computing devices. Aspects described herein are directed to developing a system for validating and standardizing recordation of data transfer processes to generate graphical maps depicting network directionality between computing devices within an enterprise computing system.

Enterprise organizations (e.g., business organizations, educational institutions, governmental entities, and the like) operate computing systems (e.g., enterprise computing systems) to enable and maintain fundamental operations across multiple areas of each enterprise organization. These computing systems typically include a number of computing devices (e.g., servers) distributed across a number of geographic locations that are connected by one or more computing networks. Accurately monitoring and tracking relationships (e.g., data transfer operations) between these computing devices may allow individuals (e.g., system administrators) of an enterprise organization to better comprehend network activities and operations for specific computing devices, geographic locations, systems, and applications of an enterprise computing system at configurable instances in time. However, existing network monitoring systems lack capabilities for standardized reporting and presentation of monitored network communications between computing devices. In some cases, existing network monitoring systems mischaracterize network communications between computing devices (e.g., invalid data transfer records). As such, an enterprise computing system may require improved systems, processes, and/or methods to monitor, record, and present information associated with network communications (e.g., data transfer processes) between computing devices.

In some cases, an enterprise computing system may include one or more modules (e.g., network sensing modules) associated with detecting and monitoring communications between computing devices via one or more networks. In some cases, a network sensing module may be stored as computer-readable instructions (e.g., an application) on a storage medium associated with a computing device. The network sensing module may detect and monitor packet header information containing metadata associated with network communications between servers and/or clusters of servers. For example, a network sensing module may monitor data transfer processes between and/or within a first cluster of servers and a second cluster of servers, identifying and storing metadata included in packet header information for each data transfer between individual servers. The network sensing module may detect, record, and store packet header information containing metadata associated with a data transfer between computing devices (e.g., servers). The packet header information may include server identifiers, port identifiers of servers, IP addresses, application identifiers, timestamps, packet information (e.g., the number of packets transferred, the number of octets transferred), and the like. In some cases, the packet header information aggregated by the network sensing module may be stored in one or more network traffic data stores. The packet header information may be stored in an unstructured state (e.g., raw network data).

In some cases, the enterprise computing system may include a network directionality mapping system for analyzing, standardizing, and illustrating the information aggregated by the one or more network sensing modules. The one or more network sensing modules may be included in the network directionality mapping system or be located external to the network directionality mapping system (e.g., in the form of third-party network sensing modules). In some cases, the network directionality mapping system may include a user interface module, such that one or more user interface screens are accessible via the user interface module. The user interface module may enable one or more individuals (e.g., system administrators) to access and/or analyze the packet header information aggregated by the one or more network sensing modules. The packet header information may be accessible at a user interface screen provided by the user interface module in the unstructured format (e.g., raw network data) in the network traffic data stores.

In some cases, the network directionality mapping system may receive and/or access the packet header information stored in the one or more network traffic data stores of the network sensing modules. The network directionality mapping system may automatically analyze, format, and/or restructure the packet header information to generate one or more data records for data transfers between servers of the enterprise computing system. During analysis of the packet header information, the network directionality mapping system may identify, based on an algorithmic process, whether packet header information is associated with a unidirectional data transfer, a bidirectional data transfer, or an invalid recordation. For example, for packet header information associated with a unidirectional data transfer between servers, the network directionality mapping system may algorithmically analyze the packet header information, extract specific elements of the packet header information (e.g., a timestamp, an IP address of the source server, an IP address of the destination server, port identifiers, packet data, and the like), and store the extracted information in a standardized data structure as a unidirectional data transferred record as specified for use with the network directionality mapping system. The unidirectional data transfer record may be stored within the network directionality mapping system and made available at a user interface screen provided by the user interface module for further analysis.

In some cases, the network directionality mapping system may algorithmically analyze packet header information, where the packet header information stored in the one or more network traffic data stores corresponds to a bidirectional data transfer between servers. Based on the algorithmic analysis, the network directionality mapping system may intelligently extract specific elements of the packet header information (e.g., a timestamp, an IP address of the first server, an IP address of the second server, port identifiers, packet data, and the like). Based on the information extracted from the packet header information, the network directionality mapping system may generate a pair of unidirectional data transfer records that are representative of the bidirectional data transfer between servers. For example, for packet header information associated with a bidirectional data transfer between servers, the network directionality mapping system may algorithmically analyze the packet header information, extract specific elements of the packet header information, and store the extracted information in a standardized data structure of the network directionality mapping system as a pair of unidirectional data transfer records. Each unidirectional data transfer record may be stored in a data store of the network directionality mapping system and may be made available at a user interface screen provided by the user interface module for further analysis.

In some cases, the network directionality mapping system may include a directionality map generator configured to generate a graphical map depicting the relationship between one or more servers of involved in data transfer operations within the enterprise computing system. The graphical map may be generated for display at a user interface screen accessible via the user interface module. After generation and/or storage of one or more data transfer records by the network directionality mapping system, the directionality map generator may be configured to access the data transfer records and, based on the configuration, generate a graphical map depicting the relationship between a first server (e.g., a source server for the data transfer) and a second server (e.g., a destination server for the data transfer). Each server involved in a data transfer may be depicted as a node in the graphical map generated by the directionality map generator. The graphical map may depict a link between nodes (e.g., servers) as a directional relationship between servers in a data transfer (e.g., source server to destination server). For example, for a bidirectional data transfer between a first server and a second server, the bidirectional data transfer may be represented as a pair of unidirectional data transfer records stored in the network directionality mapping system. The directionality map generator may generate a graphical map, with the first server and second server represented as nodes and a bidirectional link between each node representing the bidirectional data transfer between each server. The graphical map may include one or more selectable elements that may be selected via one or more input devices. When selected at a user interface screen provided by the user interface module, the selectable elements may display information (e.g., timestamp, packets transferred, and the like) associated with the selected server(s) and/or data transfer(s) (e.g., the links between servers).

FIG. 1 depicts an illustrative computing environment 100 for analyzing network traffic data to formulate standardized data transfer records and for generating directional maps indicating data movement between servers of an enterprise computing system in accordance with one or more aspects described herein. In some cases, the illustrative computing environment 100 may include an enterprise computing system 110. The enterprise computing system 110 may be operated by an enterprise organization (e.g., a business organization, an educational institution, a governmental entity, and the like). The enterprise computing system 110 may include one or more networks (e.g., a telecommunications network, the Internet, a Wi-Fi network, and the like). In some cases, the network 114 may be a wired or wireless network, such as the networks described below with respect to FIGS. 5 and 6. The enterprise computing system 110 may include one or more computing devices 101 (e.g., computing device 102, computing device 104) that are communicatively coupled to the network 114. The one or more computing devices 101 may access and/or configure elements (e.g., a network sensing module 122, a network directionality mapping system 150) of the enterprise computing system 110 via the one or more networks (e.g., network 114). The one or more computing devices 101 may include features of those described below with respect to FIG. 5.

In some cases, the enterprise computing system 110 may include one or more servers 130 (e.g., server 132, server 134, server 136, server 138). The servers 130 may include one or more features of those described below with respect to FIG. 4. The servers 130 may be communicatively coupled to the one or more networks (e.g., network 114) of the enterprise computing system 110. In some cases, the servers 130 may store one or more applications systems, and/or data stores associated with the enterprise computing system 110. The servers 130 may be distributed among a number of geographic locations, with multiple servers existing as part of a cluster of servers 133, where each server of a cluster of servers 133 may be associated with the same application, system, or data store of the enterprise computing system. The information and/or data stored at the servers 130 may be accessible by one or more network sensing modules 120 and/or a network directionality mapping system 150. Network communications (e.g., data transfers) between the servers 130 may occur via the one or more networks (e.g., network 114) of the enterprise computing system 110.

In some cases, the enterprise computing system 110 may include one or more network sensing modules 120 associated with detecting and monitoring communications between computing devices (e.g., the one or more computing devices 101, the servers 130) over a network (e.g., the network 114). The network sensing modules 120 may be communicatively coupled with one or more computing devices (e.g., computing device 102, computing device 104) to monitor network communications between the servers 130 and/or computing devices 101. The one or more network sensing modules 120 may detect and monitor information (e.g., metadata) associated with network communications between servers 130 and/or clusters of servers 133. For example, the one or more network sensing modules 120 may detect and/or record packet header information containing metadata associated with a data transfer between servers 130. The packet header information may include server identifiers, port identifiers of servers, IP addresses, application identifiers, timestamps, packet information (e.g., the number of packets transferred), and the like.

In some cases, a network sensing module (e.g., network sensing module 122) may include a network traffic data store (e.g., network traffic data store 124). In some cases, after the one or more network sensing modules 120 detect and/or record packet header information via the one or more networks (e.g., network 114), the packet header information may be stored in one or more network traffic data stores (e.g., network traffic data store 124, network traffic data store 128). In some cases, the aggregated packet header information may be stored in the network traffic data store (e.g., network traffic data store 124) associated with a specific network sensing module (e.g., network sensing module 122). Additionally or alternatively, in some cases, the aggregated packet header information may be stored in a central network traffic data store (e.g., network traffic data store 125) that is externally located from the one or more network sensing modules 120. The packet header information may be stored in the unstructured state (e.g., raw network traffic data) in which it is gathered from the network (e.g., network 114).

In some cases, the enterprise computing system 110 may include a network directionality mapping system 150 configured to aggregate, standardize, and illustrate network communications (e.g., data transfer between computing devices) acquired from the one or more network sensing modules 120 within the enterprise computing system 110. In some cases, the one or more network sensing modules 120 may be included in the network directionality mapping system 150 or be located external to the network directionality mapping system 150 (e.g., in the form of third-party network sensing modules where of the third-party network sensing modules may provide data in a different format).

In some cases, the network directionality mapping system 150 may include a user interface module 156, where one or more user interface screens of the user interface module 156 are presented to a user via a display device coupled to a computing device (e.g., computing device 102). The user interface module 156 may enable one or more individuals (e.g., system administrators) to centrally access and/or analyze the information aggregated by the one or more network sensing modules 120. One or more individuals (e.g., system administrators) may configure one or more of the elements (e.g., server information data store 152, network directionality data store 154, directionality map generator 158) of the network directionality mapping system 150 as described herein via the one or more user interface screens of the user interface module 156.

In some cases, the network directionality mapping system 150 may include a server information data store 152. The server information data store 152 may include information associated with known computing devices (e.g., computing devices 101) and/or servers (e.g., servers 130) of the enterprise computing system 110. The information stored at the server information data store 152 may include server identifiers (e.g., IP addresses), port identifiers for servers, geographic locations associated with each server, information for systems and/or applications associated with each server, and/or information indicating individuals (e.g., system administrators) and/or business units that are responsible for maintaining each server. In some cases, the network directionality mapping system 150 may be configured to automatically fetch information for storage in the server information data store 152 from one or more data stores of the enterprise computing system 110. For example, the network directionality mapping system 150 may periodically (e.g., every hour, every day, every week, and the like) or continuously fetch information from data stores associated with server information. The fetched information may be stored in the server information data store 152. Additionally or alternatively, an individual (e.g., system administrator) may configure information stored at the server information data store 152 via a user interface screen provided by the user interface module 156. For example, a system administrator may manually input information associated with a server (e.g., server 132) at a user interface screen provided by the user interface module 156.

In some cases, the enterprise computing system 110 may include a network directionality data store 154. In some cases, the network directionality mapping system 150 may be configured to receive and/or access the packet header information stored in the network traffic data stores (e.g., network traffic data store 124, network traffic data store 128) of the one or more network sensing modules 120. The network directionality mapping system 150 may automatically analyze, format, and/or restructure the aggregated packet header information to generate one or more data records (e.g., data transfer records) for data transfers between servers 130 of the enterprise computing system 110. The one or more data transfer records generated by the network directionality mapping system 150 may be stored in the network directionality data store 154, where the data transfer records may be filtered and/or searched via a user interface screen provided by the user interface module 156 based on server information (e.g., IP address identifiers, port identifiers, server cluster information, and the like) and/or transfer information (e.g., packet information, timestamp information, and the like). For analysis of the packet header information, the network directionality mapping system 150 may identify if packet header information for a data transfer is associated with a unidirectional data transfer or a bidirectional data transfer based on an algorithmic process. For example, for packet header information associated with a unidirectional data transfer between servers (e.g., server 132, server 134), the network directionality mapping system 150 may algorithmically analyze the packet header information, extract specific elements of the packet header information (e.g., a timestamp, an IP address of the source server, an IP address of the destination server, port identifiers, packet data, and the like), and store the extracted information in a standardized data structure within the network directionality data store 154 as a unidirectional data transfer record. The unidirectional data transfer record may be accessible via a user interface screen provided the user interface module 156.

In some cases, if packet header information for a data transfer stored in a network traffic data store (e.g., network traffic data store 124) corresponds to a bidirectional data transfer between servers 130 (e.g., server 132, server 134), the network directionality mapping system 150 may algorithmically analyze the packet header information to identify a bidirectional data transfer. Based on the algorithmic analysis described below with respect to FIG. 2, the network directionality mapping system 150 may extract specific elements of the packet header information (e.g., a timestamp, an IP address of the first server, an IP address of the second server, port identifiers, packet data, and the like). Based on the information extracted from the packet header information, the network directionality mapping system 150 may generate a pair of unidirectional data transfer records that are representative of the bidirectional data transfer between the servers (e.g., server 132, server 134) for storage in the network directionality data store 154. The generated pair of unidirectional data records may each include an identifier to associate the unidirectional data transfer record with a bidirectional data transfer (e.g., there exists an additional unidirectional data record corresponding to the bidirectional data transfer).

In some cases, the network directionality mapping system 150 may include a directionality map generator 158 configured to generate a graphical directionality map depicting the relationship between the servers (e.g., server 132, server 134, server 136, server 138) involved in one or more data transfers within the enterprise computing system 110. The graphical directionality map may be generated by the directionality map generator 158 based on the data transfer records stored in the network directionality data store 154 and may be displayed by a user interface screen provided by the user interface module 156. After generation and storage of one or more unidirectional data transfer records by the network directionality mapping system 150, the directionality map generator 158 may be configured to analyze the unidirectional data transfer records stored in the network directionality data store 154 and, based on the analysis, generate a graphical directionality map depicting the relationship between a first server (e.g., server 132) and a second server (e.g., server 134). Each server involved in a data transfer may be depicted as a node in the graphical directionality map generated by the directionality map generator 158. The graphical directionality map may depict a link between nodes (e.g., servers) to represent the directional aspect of the data transfer between servers (e.g., source server to destination server). For example, for a bidirectional data transfer between a first server (e.g., server 136) and a second server (e.g., server 138), the bidirectional data transfer may be represented as bidirectional link between nodes, based on a pair of unidirectional data transfer records stored in the network directionality data store 154.

For a graphical directionality map involving a depiction of a bidirectional data transfer, the directionality map generator 158 may be configured to generate a graphical directionality map, where the first server (e.g., server 134) and the second server (e.g., server 136) are represented as nodes and a bidirectional link between the nodes that represents the bidirectional nature of the data transfer. The graphical directionality map may include one or more selectable elements to be displayed on the user interface screen that may be selected via one or input devices. When selected, the selectable elements may display information associated with the selected server(s) and/or the data transfer(s) (e.g., the links between nodes). For example, at a user interface screen provided by the user interface module 156, an individual (e.g., a system administrator) may select a server 132 (e.g., a node) on the graphical directionality map, which may cause the map to display information associated with the server (e.g., IP address, port identifiers, associated systems and/or applications, additional data transfers involving the selected server, and the like) from the server information data store 152 and/or the network directionality data store 154. Additionally, at a user interface screen provided by the user interface module 156, an individual (e.g., system administrator) may select a data transfer between servers (e.g., a link) on the graphical directionality map, which may cause the graphical directionality map to display information associated with the data transfer (e.g., a time stamp, packet data for the data transfer, source and/or destination port identifiers, and the like)

In some cases, via inputs communicated to the user interface module 156, an individual (e.g., system administrator) may configure the directionality map generator 158 to generate a graphical directionality map depicting one or more data transfers. At a user interface screen, an individual (e.g., system administrator) may select individual data transfer records to be included in a graphical directionality map at the user interface module 156. In some cases, an individual (e.g., system administrator) may select one or more data transfer records to be included in a generated graphical directionality map based on the time stamp associated with the data transfer, the server(s) associated with the data transfer, the systems and/or applications associated with the server(s) involved in the data transfer, and the like. For example, a system administrator may select a 30-minute interval of time (e.g., 9:00 am-9:30 am) for which to map data transfer operations. The directionality map generator 158 may be configured to access data transfer records in the network directionality data store 154 for the configured interval of time and generate a graphical directionality map based on the associated data transfer records, where the graphical directionality map is displayed by a user interface screen provided by the user interface module 156. Additionally, for example, a system administrator may select a cluster of servers (e.g., cluster of servers 133) for which to map data transfer operations. The directionality map generator 158 may be configured to access data transfer records in the network directionality data store 154 for the configured cluster of servers and generate a graphical directionality map for the associated data transfer records, where the graphical directionality map is displayed by a user interface screen provided by the user interface module 156.

Figure 2:
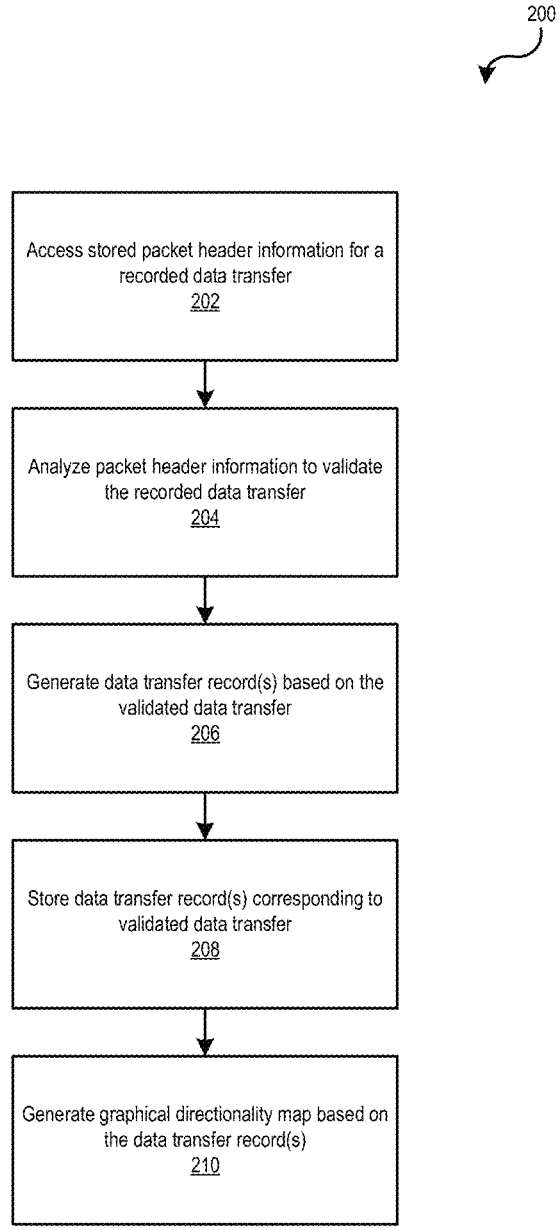
FIG. 2 depicts an illustrative event sequence for monitoring, validating, standardizing, and illustrating network communications between servers within an enterprise computing system in accordance with one or more aspects described herein.

FIG. 2 depicts an illustrative event sequence for monitoring, validating, standardizing, and illustrating network communications between servers within an enterprise computing system in accordance with one or more aspects described herein. The events shown in the event sequence 200 are shown for illustrative purposes and additional events may be added, or events may be omitted, without departing from the scope of the disclosure. At 202, the network directionality mapping system 150 may access and/or fetch packet header information stored in the network traffic data stores (e.g., network traffic data store 124, network traffic data store 128) from the one or more network sensing modules 120 via the network 114. At a user interface screen provided by the user interface module 156, an individual (e.g., system administrator) may configure the network sensing modules 120 from which packet header information is accessed and/or fetched. For example, based on the information stored at the server information data store 152, a system administrator may configure the network directionality mapping system 150 to fetch packet header information from the network sensing module 126 to analyze data transfer operations between the cluster of servers 133.

In some cases, the network directionality mapping system 150 may fetch and/or access specified packet header information, including packet header information associated with data transfers for a specific interval of time, specific servers 130 and/or clusters of servers 133, a specific geographic location, and/or specific applications and/or systems of the enterprise computing system 110. For example, at a user interface screen provided by the user interface module 156, an individual (e.g., a system administrator) may configure the network directionality mapping system 150 to fetch packet header information for data transfers to and/or from a first server (e.g., server 134) and a second server (e.g., server 136) over a 15-minute interval. In some cases, the network directionality mapping system 150 may automatically access and/or fetch packet header information from specified network sensing modules 120 on a periodic basis (e.g., every hour, every 12 hours, every day, and the like). At a user interface screen provided by the user interface module 156, an individual (e.g., system administrator) may configure automatic access and/or fetching of the packet header information by the network directionality mapping system 150. Additionally or alternatively, specific packet header information associated with data transfer for specific servers 130 and/or clusters of servers 133 may be manually selected based on the information (e.g., server identifying information) stored at the server information data store 152.

At 204, the network directionality mapping system 150 may analyze the accessed and/or fetched packet header information for the configured server(s) as described in greater detail below with respect to FIG. 3. The packet header information may be validated for accurate recordation of a data transfer by the one or more network sensing modules 120, modified based on the directionality of the data transfer indicated by the packet header information (e.g., unidirectional, bidirectional), and/or prepared for generation into one or more data transfer records. After analysis of the packet header information, the network directionality mapping system 150 may generate one or more data transfer records based on the validated records included in the packet header information at 206. For example, a single data transfer record may be generated for validated packet header information that indicates a unidirectional data transfer between servers (e.g., server 132, server 134). A pair of data transfer records may be generated for validated packet header information that indicates a bidirectional data transfer between servers (e.g., server 136, server 138), with each of the pair of data transfer records including an identifier that indicates that each record is associated with an associated data transfer record as a part of the bidirectional data transfer.

At 208, the generated data transfer record(s) may be stored in one or more standard data structures (e.g., databases, data tables, and the like) within the network directionality data store 154. The data transfer record(s) may be accessible within the network directionality data store 154 via one or more user interface screens of the user interface module 156. Via a user interface screen provided by the user interface module 156, an individual (e.g., a system administrator) may analyze and/or filter the stored data transfer records for previously recorded data transfers derived from the network sensing modules 120. For example, at a user interface screen, a system administrator may search for data transfer records associated with server 132 within the network directionality data store 154 and analyze data transfer records associated with the server 132. Further, for example, the system administrator may filter and/or search the data transfer records associated with server 132 based on the timestamp associated with the data transfer records, the application(s) and/or system(s) associated with the data transfer records, the geographic location of servers associated with the data transfer records for server 132, size (e.g., packet information) of the data transfer of each the data transfer records, and the like.

After storing the generated data transfer record(s) within the network directionality data store 154, the network directionality mapping system 150 may trigger the directionality map generator 158 to generate a graphical directionality map based on the stored data transfer record(s) at 210. The generated graphical directionality map may be displayed and/or be made accessible by the user interface module 156 at one or more user interface screens. At a user interface screen, an a system administrator may configure the directionality map generator 158 to generate the graphical directionality map based on one or more configured data transfer records. In some cases, at 210, the directionality map generator 158 may automatically generate a graphical directionality map based on the storage of one or more data transfer records in the network directionality data store 154. The directionality map generator 158 may generate the graphical directionality map based on a configuration (e.g., a base configuration), where the configuration may be modified via a user interface screen provided by the user interface module 156. For example, if a pair of data transfer records are stored (e.g., at 208), the directionality map generator 158 may automatically generate a graphical directionality map at 210 based on the pair of data transfer records stored and a base configuration. At a user interface screen provided by the user interface module 156, the system administrator may select one or more data transfer records for inclusion in the graphical directionality map based on the stored data transfer records in the network directionality data store 154. For example, after generation and storage of the data transfer record(s) at 206 and 208, a system administrator may select stored data transfer records for a cluster of servers 133 over a 2-hour time interval via a user interface screen provided by the user interface module 156. The system administrator may configure the directionality map generator 158 to generate the graphical directionality map based on the selected data transfer records and display the graphical directionality map for further analysis at a user interface screen provided by the user interface module 156. The illustrative event sequence 200 as described herein may occur simultaneously for one or more individual records included in packet header information.

Figure 3:
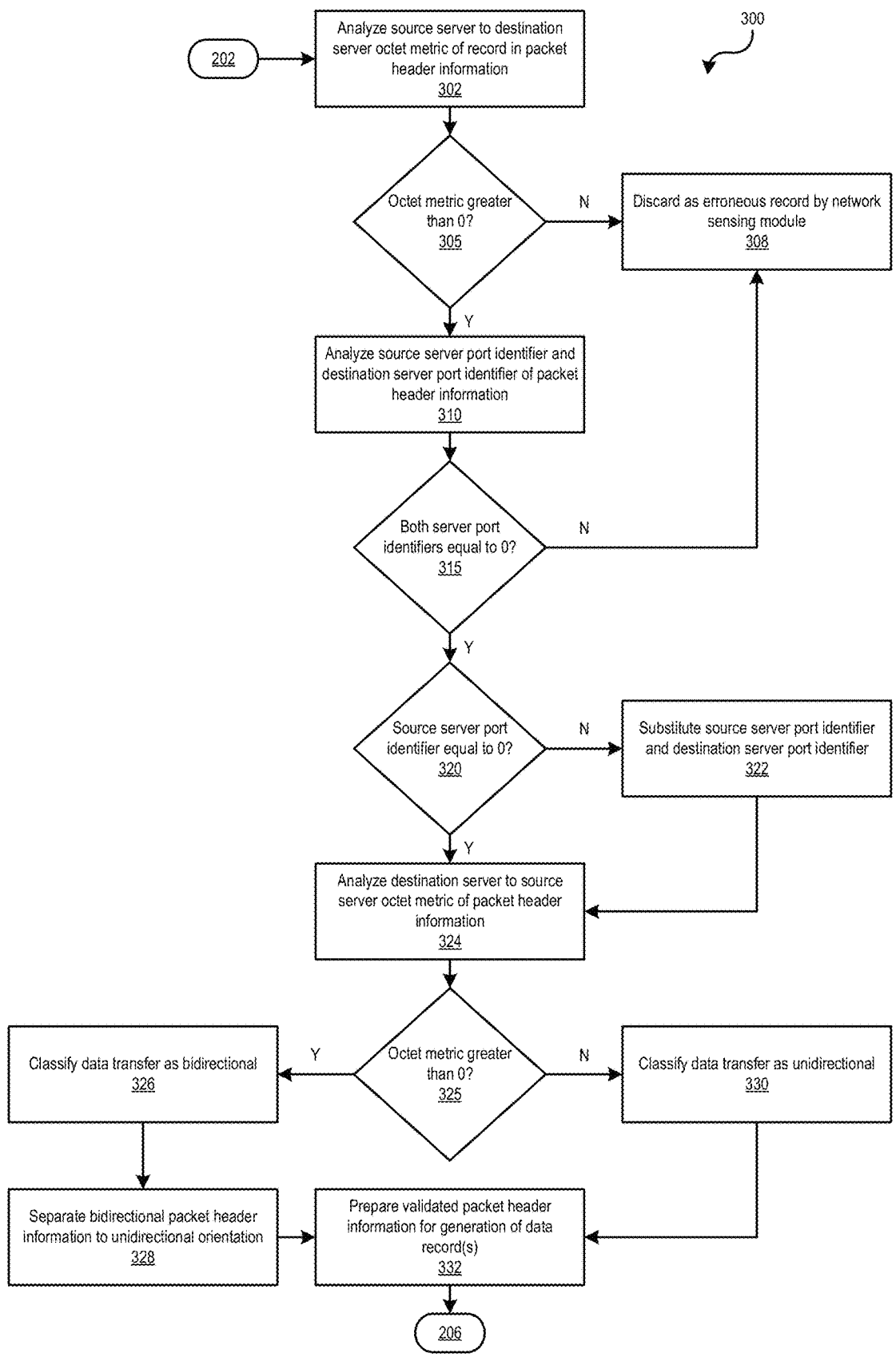
FIG. 3 depicts an illustrative event sequence for generating standardized data transfer records based on packet header information derived from network communications between servers within an enterprise computing system in accordance with one or more aspects described herein.

FIG. 3 depicts an illustrative event sequence 300 for analyzing on packet header information derived from network communications between servers within an enterprise computing system 110 in accordance with one or more aspects described herein. The events shown in the illustrative event sequence 300 are illustrative and additional events may be added, or events may be omitted, without departing from the scope of the disclosure. The packet header information derived from the network sensing modules 120 and stored in the associated network traffic data stores may contain one or more aggregated records for monitored data transfers between servers, where a record of packet header information corresponds to a data transfer. After accessing and/or fetching packet header information for a data transfer, the network directionality mapping system 150 may analyze a source server to destination server octet metric included in a record of the packet header information at 302. The octet metric is a unit of digital information that represents an eight bit data transfer between the servers 130. After identifying the source server to destination server octet metric, the network directionality mapping system 150 may determine if the source server to destination server octet metric is greater than 0 at 305. If, at 305, the source server to destination server octet metric is not greater than 0, the record of the packet header information containing the corresponding source server to destination server octet metric may be classified as an erroneous record and discarded at 308, where the erroneous record was recorded in error by the network sensing module (e.g., network sensing module 122) associated with the packet header information. Classifying a record of packet header information as an erroneous record may terminate the illustrative event sequence 300 for the erroneous record. If, at 305, the analyzed source server to destination server octet metric is greater than 0, the network directionality mapping system 150 may analyze a source server port identifier and a destination server port identifier in a record of the packet header information at 310.

After analyzing the source server port identifier and destination server port identifier, the network directionality mapping system 150 may determine if both the source server port identifier and destination server port identifier are equal to 0 at 315. If, at 315, both the source server port identifier and destination server port identifier are equal to 0, the record of the packet header information containing the corresponding source server to destination server octet metric may be classified as an erroneous record and discarded at 308 as described herein. If, at 315, both the source server port identifier and destination server port identifier are not equal to 0, the network directionality mapping system 150 may determine if the source server port identifier is equal to 0 at 320. If, at 320, the source server port identifier is equal to 0, the network directionality mapping system 150 may analyze a destination server to source server octet metric included in the record of the packet header information at 324. If, at 320, the source server port identifier is not equal to 0, the network directionality mapping system 150 may substitute (e.g., swap) the port identifiers for the source server port identifier and destination server port identifier at 322, as the network sensing module (e.g., network sensing module 122) associated with the packet header information recorded the port identifiers in error if the server port identifier is equal to 0. After substituting the port identifiers for the source server port identifier and destination server port identifier, the network directionality mapping system 150 may analyze a destination server to source server octet metric included in the record of the packet header information at 324 as described herein.

After analyzing the destination server to source server octet metric included in the record of the packet header information, the network directionality mapping system 150 may determine if the destination server to source server octet metric is greater than 0 at 325 to determine the directionality of the data transfer captured by the record of the packet header information. If, at 325, the destination server to source server octet metric is greater than 0, the data transfer may be classified as bidirectional at 326, as the octet metrics originating from both the source server and destination were greater than zero, indicating that data was bidirectionally transferred. After classifying the data transfer as bidirectional, the network directionality mapping system 150 may separate the record of the packet header information to a pair of unidirectional records at 328, where the pair of unidirectional records are representative of the bidirectional data transfer in the record of the packet header information. After separating the bidirectional record of the packet header information to a pair of unidirectional records, the network directionality mapping system 150 may prepare the validated records of the packet header information at 332 for generation as data transfer records in the network directionality data store 154. If, at 325, the destination server to source server octet metric is not greater than 0, the data transfer may be classified as unidirectional at 330, as the octet metrics originating from both the source server and destination were greater than zero in only the direction of the source server to the destination server, indicating that data was unidirectionally transferred. After classifying the data transfer as unidirectional, the network directionality mapping system 150 may prepare the validated record of the packet header information at 332 for generation as a data transfer record in the network directionality data store 154. After 332, the illustrative event sequence may continue to 206 and continue the illustrative event sequence 200 with respect to FIG. 2 as described above.

Figure 4A:
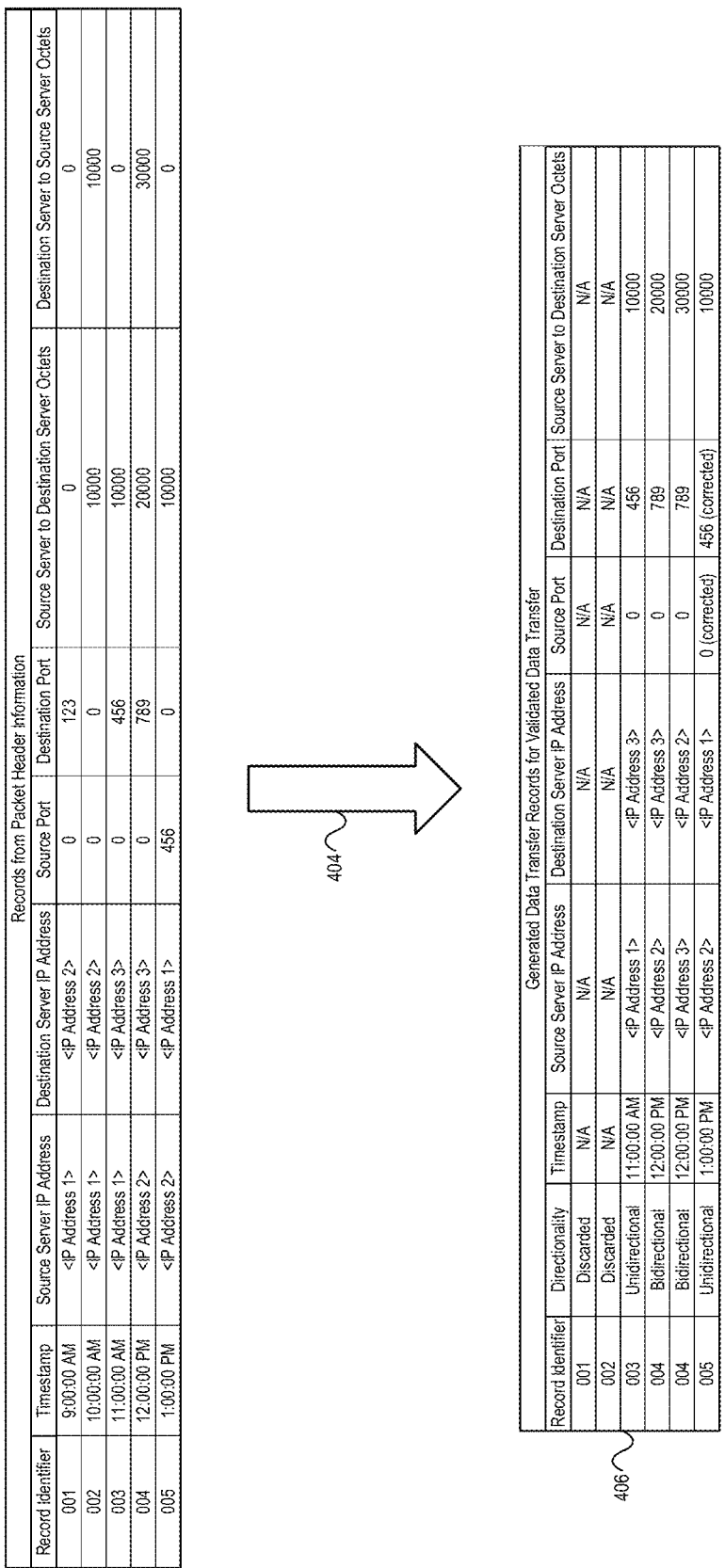
FIG. 4A depicts illustrative data transfer records stored in the network directionality mapping system that are derived from packet header information from network communications between servers in accordance with one or more aspects described herein.

FIG. 4A depicts illustrative data transfer records stored in the network directionality mapping system 150 that are derived from packet header information from communications between servers 130 in accordance with one or more aspects described herein. The table 402 depicts the records of packet header information derived from the one or more network sensing modules 120 in the enterprise computing system 110. The records in table 402 are illustrative and used as example for the communication activity and/or packet header information identified by the one or more network sensing modules 120. The records of table 402 may include, for example, a record identifier, a timestamp for a data transfer, a source server IP address, a destination server IP address, a source port for a data transfer, a destination port for a data transfer, source server to destination server octet information for a data transfer, and/or destination server to source server octet information for a data transfer (e.g., for a bidirectional data transfer). The information included in the records of table 402 may be modified, supplemented, and/or other removed without departing from the scope of the present disclosure. For example, the records in table 402 may include application identifiers, geographic identifiers, hostname identifiers, volume identifiers, location identifiers for storage locations at servers 130, and the like.

The table 406 depicts the generated data transfer records that are generated based on validating and modifying the records of packet header information of table 402. The data transfer records in table 406 are illustrative and used as an example representative of records generated by the network directionality mapping system 150 to track network communications (e.g., data transfer) between servers 130. The data transfer records of table 406 may be stored in the network directionality data store 154 of the network directionality mapping system 150. In some cases, the data transfer records of table 406 may be accessible via one or more user interface screens provided by the user interface module 156, where the data transfer records may be searched, filtered, and/or otherwise prepared for further analysis by one or more individuals (e.g., system administrators) via the one or more computing devices 101. The data transfer records of table 406 may include, for example, a record identifier, an indicator of the directionality associated with the data transfer, a timestamp for a data transfer, a source server IP address, a destination server IP address, a source port for a data transfer, a destination port for a data transfer, and/or source server to destination server octet information for a data transfer. The data transfer records of table 406 may be unidirectional, or in some cases, be a combination of unidirectional data transfer records that are representative of a bidirectional data transfer. The information included in the data transfer records of table 406 may be modified, supplemented, and/or other removed without departing from the scope of the present disclosure. For example, the data transfer records in table 406 may include application identifiers, geographic identifiers, hostname identifiers, volume identifiers, location identifiers for storage locations at servers 130, and the like.

The transformation 404 is representative of transforming the records of packet header information of table 402 when generating the data transfer records of table 406. The transformation 404 may include executing the illustrative event sequence 200 and 300 with respect to FIG. 2 and FIG. 3 to generate table 406 based on the information of table 402. The transformation 404 may execute to discard records of packet header information as erroneous in accordance with illustrative event sequences 200 and 300. For example, the record 001 in table 402 is discarded as an erroneous record by transformation 404 because the source server to destination server octet metric for the record 001 is not greater than 0, as shown above in steps 305 and 308. As a result, the corresponding data transfer record 001 in table 406 indicates "Discarded" in the Directionality column in accordance with the transformation 404 as described herein. Additionally, for example, the record 002 in table 402 is discarded as an erroneous record by transformation 404 because the source server port identifier and the destination server port identifier are both equal to 0 for the record 002, as shown above in steps 315 and 308. As a result, the corresponding data transfer record 002 in table 406 indicates "Discarded" in the Directionality column in accordance with the transformation 404 as described herein.

In some cases, the transformation 404 may execute to generate one or more data transfer records for unidirectional and/or bidirectional data transfer. For example, the record 003 in table 402 may be validated by the transformation 404 to generate the corresponding data transfer record 003 in table 406. The resulting data transfer record 003 may be classified as "Unidirectional" in the Directionality column of table 406 because the destination server to source server octet metric is equal to 0, as shown above in steps 325 and 330. Additionally, for example, the record 004 in table 402 may be validated by the transformation 404 to generate the corresponding pair of data transfer records 004 in table 406. The resulting pair of data transfer records 004 may be classified as "Bidirectional" in the Directionality column of table 406 because the destination server to source server octet metric is greater than 0, as shown above in steps 325 and 326. Additionally, for example, the record 005 in table 402 may be validated by the transformation 404 to generate the corresponding data transfer record 005 in table 406. The resulting data transfer record 005 may be classified as "Unidirectional" in the Directionality column of table 406 because the destination server to source server octet metric is equal to 0, as shown above in steps 325 and 330. The data transfer record 005 may have a corrected (e.g., swapped) source port identifier and a corrected destination port identifier in contrast to the source port identifier and destination port identifier of the record 005 in table 402, as shown above with reference to steps 320 and 322.

Figure 4B:
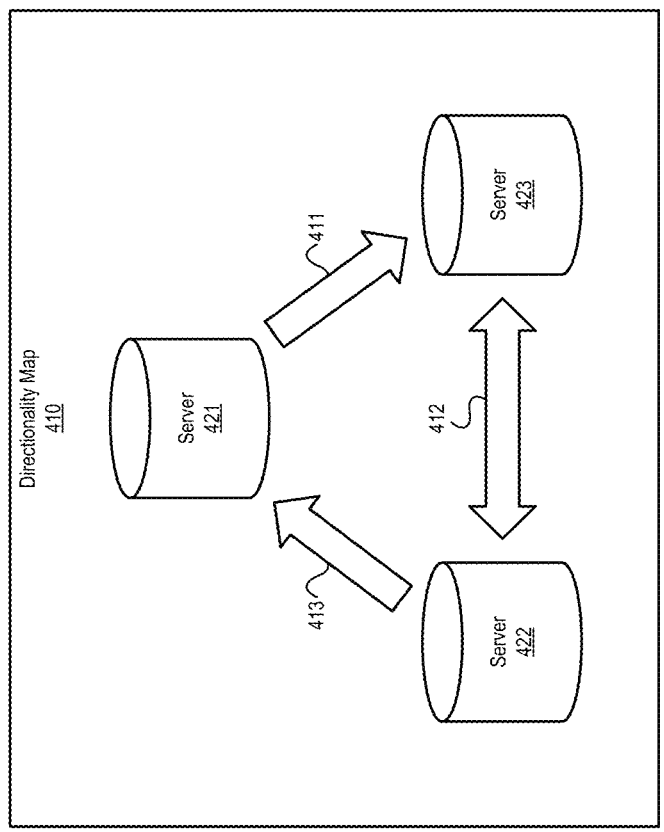
FIG. 4B depicts an illustrative example of a generated directionality map based on stored data transfer records in accordance with one or more aspects described herein.

FIG. 4B depicts an illustrative example of a directionality map 510 generated by the directionality map generator 158 based on generated data transfer records in accordance with one or more aspects described herein. A server information table 420 may match server names with corresponding IP address information for each server, where the server information table may be stored in the server information data store 152. At one or more user interface screens provided by the user interface module 156, an individual (e.g., a system administrator) may configure the directionality map generator 158 to generate one or more graphical directionality maps (e.g., directionality map 410) based on the generated data transfer records stored in the network directionality data store 154. An individual may select one or more data transfer records from those stored in the network directionality data store 154 for inclusion in a generated directionality map (e.g., directionality map 410). For example, a system administrator may configure the directionality map generator 158 to generate a directionality map 410 on the data transfer records of table 406 in FIG. 4A. The directionality map 410 may include server 421, server 422, and server 423 that correspond to IP address "<IP Address 1>", "<IP Address 2>", and "<IP Address 3>" as depicted in the server information table 420 and in FIG. 4A. Each server of the directionality map 410 may be depicted a node, with data transfers between each server depicted as directional links (e.g., link 411, link 412, link 413) between the servers. For example, link 411 may correspond to the data transfer record with record identifier "003" of table 406, which corresponds to a unidirectional data transfer between server 421 and server 423. Additionally, for example, link 412 may correspond to the data transfer records with record identifiers "004" of table 406, which corresponds to a bidirectional data transfer between server 422 and server 423, as indicated by the bidirectional nature of link 412. Additionally, for example, link 413 may correspond to the data transfer record with record identifier "005" of table 406, which corresponds to a unidirectional data transfer between server 422 and server 421. The directionality map 410 is an illustrative example that may be altered, supplemented, and/or otherwise modified without departing from the scope of the present disclosure.

Figure 5:
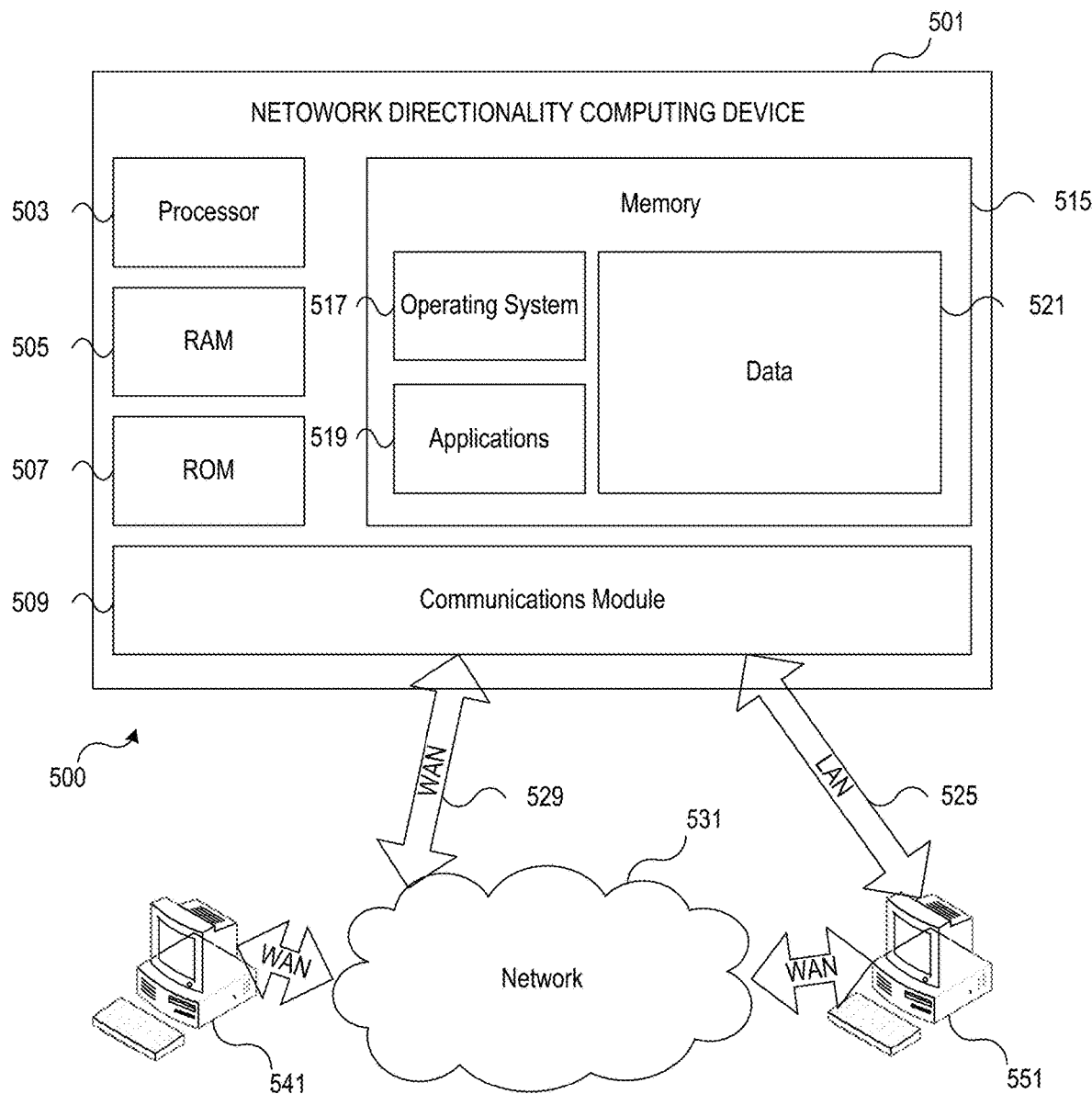
FIG. 5 shows an illustrative operating environment in which various aspects of the disclosure may be implemented in accordance with one or more aspects described herein.

FIG. 5 shows an illustrative operating environment in which various aspects of the present disclosure may be implemented in accordance with one or more illustrative embodiments. Referring to FIG. 5, a computing system environment 500 may be used according to one or more illustrative embodiments. The computing system environment 500 is only one example of a suitable computing environment and is not intended to suggest any limitation as to the scope of use or functionality contained in the disclosure. The computing system environment 500 should not be interpreted as having any dependency or requirement relating to any one or combination of components shown in the illustrative computing system environment 500.

The computing system environment 500 may include an illustrative network directionality computing device 501 having a processor 503 for controlling overall operation of the network directionality computing device 501 and its associated components, including a Random Access Memory (RAM) 505, a Read-Only Memory (ROM) 507, a communications module 509, and a memory 515. The network directionality computing device 501 may include a variety of computer readable media. Computer readable media may be any available media that may be accessed by the network directionality computing device 501, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by the network directionality computing device 501.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed by the processor 503 of the network directionality computing device 501. Such a processor may execute computer-executable instructions stored on a computer-readable medium.

Software may be stored within the memory 515 and/or other digital storage to provide instructions to the processor 503 for enabling the network directionality computing device 501 to perform various functions as discussed herein. For example, the memory 515 may store software used by the network directionality computing device 501, such as an operating system 517, one or more application programs 519, and/or an associated database 521. In addition, some or all of the computer executable instructions for the network directionality computing device 501 may be embodied in hardware or firmware. Although not shown, the RAM 505 may include one or more applications representing the application data stored in the RAM 505 while the network directionality computing device 501 is on and corresponding software applications (e.g., software tasks) are running on the network directionality computing device 501.

The communications module 509 may include a microphone, a keypad, a touch screen, and/or a stylus through which a user of the network directionality computing device 501 may provide input, and may include one or more of a speaker for providing audio output and a video display device for providing textual, audiovisual and/or graphical output. The computing system environment 500 may also include optical scanners (not shown).

The network directionality computing device 501 may operate in a networked environment supporting connections to one or more remote computing devices, such as the computing devices 541 and 551. The computing devices 541 and 551 may be personal computing devices or servers that include any or all of the elements described above relative to the network directionality computing device 501. The computing devices 101 and/or servers 130 may include any or all of the elements described above relative to the network directionality computing device 501.

The network connections depicted in FIG. 5 may include a Local Area Network (LAN) 525 and/or a Wide Area Network (WAN) 529, as well as other networks. When used in a LAN networking environment, the network directionality computing device 501 may be connected to the LAN 525 through a network interface or adapter in the communications module 509. When used in a WAN networking environment, the network directionality computing device 501 may include a modem in the communications module 509 or other means for establishing communications over the WAN 529, such as a network 531 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 6:
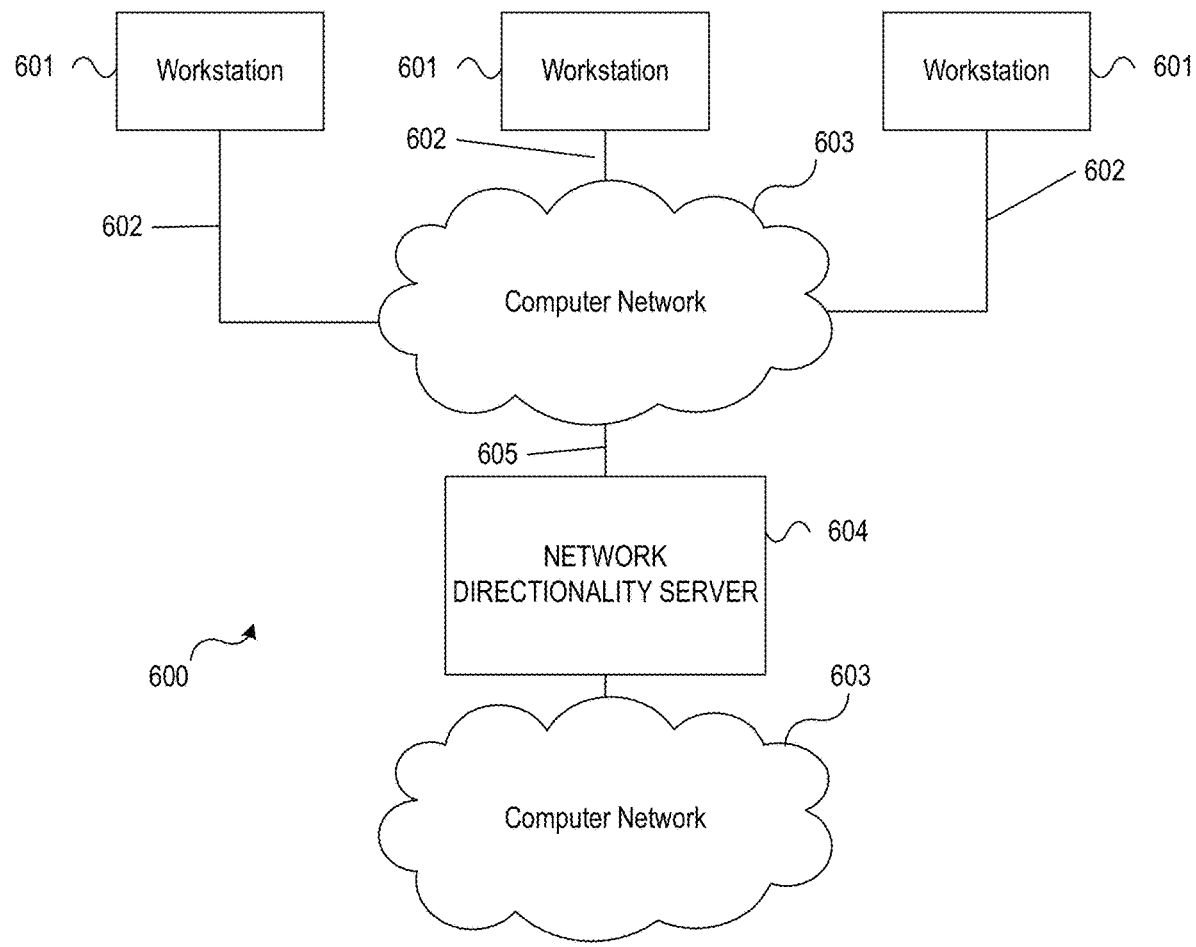
FIG. 6 shows an illustrative block diagram of workstations and servers that may be used to implement the processes and functions of certain aspects of the present disclosure in accordance with one or more aspects described herein.

FIG. 6 shows an illustrative block diagram of workstations and servers that may be used to implement the processes and functions of certain aspects of the present disclosure in accordance with one or more example embodiments. For example, an illustrative system 600 may be used for implementing illustrative embodiments according to the present disclosure. As illustrated, the system 600 may include one or more workstation computers 601. The workstation 601 may be, for example, a desktop computer, a smartphone, a wireless device, a tablet computer, a laptop computer, and the like, configured to perform various processes described herein. The workstations 601 may be local or remote, and may be connected by one of the communications links 602 to a computer network 603 that is linked via the communications link 605 to the network directionality server 604. In the system 600, the network directionality server 604 may be a server, processor, computer, or data processing device, or combination of the same, configured to perform the functions and/or processes described herein, for example, with respect to computing devices 101 and/or servers 130. The network directionality server 604 may be used to receive check images and associated data and/or validation scores, retrieve user profile, evaluate the check image compared to the user profile, identify matching or non-matching elements, generate user interfaces, and the like.

The computer network 603 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. The communications links 602 and 605 may be communications links suitable for communicating between the workstations 601 and the network directionality server 604, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

The invention claimed is:

1. A system, comprising:
a network comprising a network sensing module recording packet header information of communications sent via the network;
a computing platform, comprising:
at least one processor;
a communication interface communicatively coupled to the at least one processor; and
memory storing computer-readable instructions that, when executed by the at least one processor, cause the computing platform to:
receive, from the network sensing module, packet header information corresponding to a record of a first data transfer between a first computing device and a second computing device, wherein the packet header information comprises octet information corresponding to an eight bit data transfer;
analyze, the record to validate the recordation of the first data transfer by the network sensing module and to identify the first data transfer as unidirectional or bidirectional;
generate, based on a validation of the record, a first data transfer record for storage in a network directionality data store, wherein the first data transfer record is representative of the first data transfer from the first computing device to the second computing device;
store, based on the octet information, an indication of an erroneous data transfer in the first data transfer record, when the octet information is equal to zero;
generate, by a directionality map generator with a first configuration and based on the network directionality data store, a directionality map comprising a graphical representation of data transfer relationships between the first computing device and the second computing device, wherein directionality of data transfer records is determined based on octet information associated with one or more data transfer records communicated between the first computing device and the second computing device; and
cause to be displayed, at a user interface of a user device, the directionality map.

2. The system of claim 1, wherein the instructions, when executed by the one or more processors, cause the computing platform to:
generate, based on an identification that the data transfer is a bidirectional data transfer, a second data transfer record associated with the bidirectional data transfer and representative of a second data transfer from the second computing device to the first computing device for storage in the network directionality data store.

3. The system of claim 2, wherein the first data transfer and the second data transfer of the bidirectional data transfer occurs simultaneously between the first computing device and the second computing device.

4. The system of claim 1, wherein the instructions, when executed by the one or more processors, cause the computing platform to:
discard, based on an identification of an invalid packet data metric contained within the record, the packet header information corresponding to the record.

5. The system of claim 1, wherein the instructions, when executed by the one or more processors, cause the computing platform to:
compare a first computing device port identifier and a second computing device port identifier contained within the record; and
discard, based on an identification of an invalid comparison of the first computing device port identifier and the second computing device port identifier contained within the record, the packet header information corresponding to the record.

6. The system of claim 1, wherein the instructions, when executed by the one or more processors, cause the computing platform to:
swap, based on an identification of an invalid first computing device port identifier, the invalid first computing device port identifier with a second computing device port identifier.

7. The system of claim 1, wherein the instructions, when executed by the one or more processors, cause the computing platform to:
configure, by a user interface module, a second configuration for use by the directionality map generator for generation of a second directionality map, wherein a data transfer relationship between a plurality of computing devices is based on a plurality of data transfer records stored in the network directionality data store; and
generate, by the second configuration of the directionality map generator and based on the plurality of data transfer records stored in the network directionality data store, the second directionality map.

8. A method, comprising:
receiving, via a network and from a network sensing module, a record comprising packet header information of a first data transfer between a first computing device and a second computing device, wherein the packet header information comprises a first octet parameter corresponding to information communicated during the first data transfer;
identifying, based on the first octet parameter, directionality of the first data transfer as unidirectional or bidirectional based on a value of one or both of the first octet parameter of the first data transfer and a second octet parameter of a second data transfer between the first computing device and the second computing device;
generating, based on validation of the record, a first data transfer record representative of the first data transfer from the first computing device to the second computing device;
storing, in a network directionality data store, the first data transfer record;

generating, by a directionality map generator with a first configuration and based on the network directionality data store, a directionality map comprising a graphical representation of a data transfer relationship between the first computing device and the second computing device; and
causing, at a user interface of a user device, display of the directionality map.

9. The method of claim 8, comprising:
generating, based on an identification of a bidirectional data transfer, a second data transfer record associated with the bidirectional data transfer and representative of a second data transfer from the second computing device to the first computing device for storage in the network directionality data store.

10. The method of claim 8, comprising:
discarding, based on an identification of an invalid packet data metric contained within the record, the packet header information corresponding to the record.

11. The method of claim 8, comprising:
comparing a first computing device port identifier and a second computing device port identifier contained within the record; and
discarding, based on an identification of an invalid comparison of the first computing device port identifier and the second computing device port identifier contained within the record, the packet header information corresponding to the record.

12. The method of claim 8, comprising:
swapping, based on an identification of an invalid first computing device port identifier, the invalid first computing device port identifier with a second computing device port identifier.

13. The method of claim 8, comprising:
configuring, by a user interface module, a second configuration for use by the directionality map generator for generation of a second directionality map, wherein a data transfer relationship between a plurality of computing devices is based on a plurality of data transfer records stored in the network directionality data store; and
generating, by the second configuration of the directionality map generator and based on the plurality of records stored in the network directionality data store, the second directionality map.

14. The method of claim 8, wherein the record comprises a timestamp for the data transfer, a first IP (internet protocol) address associated with the first computing device, a second IP address associated with the second computing device, a first computing device port identifier, a second computing device port identifier, and packet data metrics associated with the data transfer.

15. One or more non-transitory computer-readable media storing instructions that, when executed by a computing platform comprising at least one processor, memory, and a communication interface, cause the computing platform to:
receive, via a network and from a network sensing module, packet header information corresponding to each record of a plurality of records associated with data transfer between a first computing device and a second computing device, wherein the packet header information comprises first octet information associated with a first data transfer between the first computing device and the second computing device and second octet associated with a second data transfer between the first computing device and the second computing device;

validate the recordation of the first data transfer by the network sensing module;

identify the first data transfer as either unidirectional or bidirectional, based on non-zero first octet information and second octet information that equals zero and wherein bidirectional data transfer corresponds both the first octet information and the second octet information being non-zero;

generate, based on a validation of the record, a first data transfer record for storage in a network directionality data store, wherein the first data transfer record is representative of the first data transfer from the first computing device to the second computing device;

generate, by a directionality map generator with a first configuration and based on the network directionality data store, a directionality map comprising a graphical representation of a data transfer relationship between the first computing device and the second computing device; and cause to be displayed, at a user interface of a user device, the directionality map.

16. The one or more non-transitory computer-readable media of claim 15, wherein the instructions, when executed by the one or more processors, cause the computing platform to:

generate, based on an identification that the data transfer is a bidirectional data transfer, a second data transfer record associated with the bidirectional data transfer and representative of a second data transfer from the second computing device to the first computing device for storage in the network directionality data store.

17. The one or more non-transitory computer-readable media of claim 15, wherein the instructions, when executed by the one or more processors, cause the computing platform to:

discard, based on an identification of an invalid packet data metric contained within the record, the packet header information corresponding to the record.

18. The one or more non-transitory computer-readable media of claim 15, wherein the instructions, when executed by the one or more processors, cause the computing platform to:

compare a first computing device port identifier and a second computing device port identifier contained within the record; and discard, based on an identification of an invalid comparison of the first computing device port identifier and the second computing device port identifier contained within the record, the packet header information corresponding to the record.

19. The one or more non-transitory computer-readable media of claim 15, wherein the instructions, when executed by the one or more processors, cause the computing platform to:

swapping, based on an identification of an invalid first computing device port identifier, the invalid first computing device port identifier with a second computing device port identifier.

20. The one or more non-transitory computer-readable media of claim 15, wherein the instructions, when executed by the one or more processors, cause the computing platform to:

configure, by a user interface module, a second configuration for use by the directionality map generator for generation of a second directionality map, wherein a data transfer relationship between a plurality of computing devices is based on a plurality of data transfer records stored in the network directionality data store; and generate, by the second configuration of the directionality map generator and based on the plurality of records stored in the network directionality data store, the second directionality map.

\* \* \* \* \*